(12) United States Patent
Gillich et al.

(10) Patent No.: US 6,310,737 B1
(45) Date of Patent: Oct. 30, 2001

(54) REFLECTOR WITH A RESISTANT SURFACE

(75) Inventors: Volkmar Gillich, Neuhausen am Rheinfall; Renato Kirin, Thayngen; Roman Fuchs, Schaffhausen, all of (CH)

(73) Assignee: Alusuisse Technology & Management, Neuhausen am Rheinfall (CH)

(*) Notice: Subject to any disclaimer, the term of this patent is extended or adjusted under 35 U.S.C. 154(b) by 0 days.

(21) Appl. No.: 09/554,147
(22) PCT Filed: Nov. 12, 1998
(86) PCT No.: PCT/CH98/00488
§ 371 Date: May 10, 2000
§ 102(e) Date: May 10, 2000
(87) PCT Pub. No.: WO99/27395
PCT Pub. Date: Jun. 3, 1999

(30) Foreign Application Priority Data

Nov. 19, 1997 (EP) .................................................. 97810881

(51) Int. Cl.$^7$ ............................ G02B 5/08; G02B 7/182
(52) U.S. Cl. ............................................. 359/883; 359/884
(58) Field of Search ..................................... 359/838, 848, 359/883, 884

(56) References Cited

U.S. PATENT DOCUMENTS

| | | |
|---|---|---|
| 5,216,551 | 6/1993 | Fujii . |
| 5,361,172 * | 11/1994 | Schissel et al. ...................... 359/883 |
| 5,403,657 | 4/1995 | Textor et al. . |
| 5,424,876 | 6/1995 | Fujii . |
| 5,527,562 | 6/1996 | Balaba et al. . |
| 5,527,572 | 6/1996 | Textor et al. . |
| 5,582,863 | 12/1996 | Textor et al. . |
| 5,583,704 | 12/1996 | Fujii . |
| 5,663,001 | 9/1997 | Textor et al. . |
| 5,978,133 * | 11/1999 | Gillich ................................ 359/359 |

FOREIGN PATENT DOCUMENTS

| | | |
|---|---|---|
| 0358011 | 8/1989 | (EP) . |
| 0456488 | 11/1991 | (EP) . |
| 0495755 | 7/1992 | (EP) . |
| 0568943 | 11/1993 | (EP) . |
| 0610831 | 2/1994 | (EP) . |
| 1507532 | 4/1978 | (GB) . |
| 2267509 | 12/1993 | (GB) . |
| 2292751 | 6/1996 | (GB) . |
| WO 97/01775 | 1/1997 | (WO) . |

OTHER PUBLICATIONS

Hass et al., *Applied Optics*, vol. 14, No. 11, (Nov. 1975), pp. 2639 to 2644.

* cited by examiner

*Primary Examiner*—Cassandra Spyrou
*Assistant Examiner*—Mark A. Robinson
(74) *Attorney, Agent, or Firm*—Fisher, Christen & Sabol

(57) ABSTRACT

A reflector, with high total reflection, resisting mechanical stress and having a reflector body on which the following components are superimposed (a) a functional coating, e.g., a varnish, (b) a reflection layer structure composed of a reflecting metallic layer and a transparent ceramic layer, having for instance a geometric thickness of 3 nm or more or an optical depth of $\lambda 2$, applied on the top of the metallic layer. The layer arranged on the surface of the reflection layer structure is formed by the transparent layer which acts simultaneously as a protection layer. The protection layer is a silicon oxide of general formula $SiO_x$, where x is a number from 1.1 to 2.0, or is an aluminum oxide of formula $Al_2O_3$. The protection layer protects the underlying layers from mechanical stresses. In the DIN 58196 wipe test, the protected layer shows no damage after 50 test cycles, each with 100 wiping strokes. These reflectors are useful in the field of lighting and illumination where they can be used for lighting of display units with screens, primary lighting, secondary lighting, raster lighting, light ceilings or light deflector lamella.

39 Claims, No Drawings

REFLECTOR WITH A RESISTANT SURFACE

BACKGROUND OF THE INVENTION

1. Field of the Invention

The invention relates to a reflector with high total reflection, resisting mechanical stress and comprising a reflector body on which the following components are superimposed, a) a functional coating, b) a reflection layer structure containing a reflecting layer and a transparent layer.

The invention relates also to the use of such reflectors.

2. Background Art

It is generally known to produce strips of highly reflective materials such as e.g. high purity aluminium or AlMg alloys based on aluminium with a purity level of 99.8% and higher, such as e.g. 99.9%, and to produce roll surfaces that create diffuse or directional reflection, depending on the application. It is also known, in order to increase the directional reflection (degree of reflection), to brighten the surfaces of such strips chemically or electrolytically and subsequently to provide them with a protective, e.g. 1.5 $\mu$m thick layer by anodic oxidation.

The known processes have the further disadvantage that high purity and expensive brightening alloys based on high purity aluminium have to be employed. The anodic oxide layer causes the degree of reflection to be lowered and, as a result, both the total reflection and the directional reflection, this due to absorption and diffuse light scattering in particular in the oxide layer. This represents a loss of energy.

Known from EP-A-0 495 755 are items with surfaces of aluminium which are suitable for depositing layer systems from the gas phase onto these surfaces. Anodising the surface is dispensed with and a layer system is described comprising e.g. an adhesive layer, such as a ceramic layer, a light reflecting layer, such as a metallic layer e.g. of aluminium and one or more transparent protective layers e.g. of the oxides, nitrides or fluorides of magnesium, titanium or praseodymium. Such layer systems exhibit a high degree of reflection. Such a layer system, however, has the disadvantage of being very sensitive to mechanical effects.

EP-A-0 586 943 describes the precipitation of a reflection layer which is based on aluminium and superimposed on this a gel film that has been deposited on the aluminium by a sol-gel process. The reflection is achieved by a layer system comprising layers of silicon oxide, metal, silicon dioxide and titanium dioxide. This is also a possibility for achieving reflecting aluminium-based materials. The layer structure described in EP-A 0 568 943 is not resistant to mechanical stress to the desired degree.

BROAD DESCRIPTION OF THE INVENTION

The object of the present invention is to avoid the above mentioned disadvantages and to propose reflectors with outer layers that are insensitive to external mechanical stress and are characterized by a high resistance to wiping.

That objective is achieved by way of the invention in that the reflection layer structure comprises a reflecting layer and a protective layer, in the form of a silicon oxide of general formula $SiO_x$ where x represents a number from 1.1 to 2.0, or in the form of an aluminium oxide of thickness 3 nm or greater, and the protective layer as the layer lying on the surface protects the underlying layers against mechanical damage, and the protective layer exhibits no surface damage in the wipe test according to DIN 58196 after 50 test cycles each of 100 wiping strokes.

The protective layer is, analogously, a transparent layer.

Usefully the minimum thickness of the protective layer amounts to 3 nm. The maximum thickness of the protective layer may e.g. be 1000 nm, advantageously 400 nm. The thickness of the protective layer is preferably 40 nm or less, in particular 20 nm and less. In the present description of the invention the letters nm stand for nanometer.

In a further version the thickness of the protective layer can also be defined by its optical thickness (or depth). The optical thickness is preferably described by the formula $n \cdot d = \lambda/2 \pm 40$ nm. The optical thickness may also be a multiple thereof expressed by the formula $n \cdot d = (k \cdot \lambda/2) \pm 40$ nm, where k is a natural number such as 2, 3, 4, 5, 6. 7, 8, 9 or 10. In this formula n stands for the index of refraction and d the geometric thickness. The symbol $\lambda$ stands for the intensity maximum of the wave lengths of the reflected electromagnetic radiation. In the case of visible light $\lambda$ lies in the region of approximately 550 nm. As mentioned above the optical thickness of the protective layer may vary according to the equation $(k \cdot \lambda/2) \pm 40$ nm.

DETAILED DESCRIPTION OF THE INVENTION

The reflecting body in question may be any three-dimensional object having at least one free surface of a metal, such as iron, steel, aluminium or aluminium alloy, or plastic, ceramic or glass. This free surface may be e.g. an aluminium with a purity of 98.3% and higher, in some cases 99.0% and higher, 99.7% and higher or 99.95% and higher. Apart from aluminium of the above mentioned purities the surface may also be of an alloy. Preferred alloys are those belonging to the AA 1000, AA 3000 and AA 5000 series. Further preferred alloys contain e.g. 0.25 to 5 wt. % magnesium, in particular 0.5 to 4 wt. % magnesium, or 0.2 to 2 wt. % manganese, or 0.5 to 5 wt. % magnesium and 0.2 to 2 wt. % manganese, in particular e.g. 1 wt. % magnesium and 0.5 wt. % manganese or contain 0.1 to 12 wt. % copper, preferably 0.1 to 5 wt. % copper or contain or contain 0.5 to 6 wt. % zinc and 0.5 to 5 wt. % magnesium, or contain 0.5 to 6 wt. % zinc, 0.5 to 5 wt. % magnesium and 0.5 to 5 wt. % copper, or contain 0.5 to 2 wt. % iron and 0.2 to 2 wt. % manganese, in particular e.g. 1.5 wt. % iron and 0.4 wt. % manganese or AlMgSi alloys or AlFeSi alloys. Further examples are AlMgCu alloys such as A199.85Mg0.8Cu or AlMg alloys such as AlMg1.

Especially preferred free surfaces are e.g. of aluminium having a purity of 99.5 % and higher, 99.8% and higher, 99.85 % or surfaces of an aluminium alloy containing 0.5 wt. % magnesium or containing 1 wt. % magnesium, or containing aluminium having a purity of 99% and 5 to 10 wt % magnesium, in particular 7 wt. % magnesium and 6 to 12 wt. % copper, in particular 8 wt. % copper. Especially preferred are also all aluminium alloys that can be rolled.

Examples of reflector bodies are castings and forgings and, in particular, rolled products such as foils, strips, plates, sheets that may be—if necessary—shape-formed by bending, deep-drawing, cold impact extrusion and the like. Further, extrusions, beams or other shapes may be employed. Depending on the application in question, the whole reflector body may be made of metal, preferably of the above mentioned aluminium or aluminium alloy; it is possible for only parts or only parts of the surface area to be of metal.

The above mentioned metal and in particular the aluminium or aluminium alloy may also be part or a part of a surface of a composite e.g. a laminated foil or laminates of any material of choice such as e.g. plastics and metals such as Al-coated steel sheet or Al-coated plastic.

The metal or aluminium surfaces may e.g. be created by changing the surface chemically and/or mechanically e.g. by rolling, forging, cold impact extrusion, extrusion or casting and sub-sequently treated by grinding, polishing, surface blasting with hard materials etc. Preferred are rolled surfaces created using smooth or structured rolls.

Preferred reflector bodies are aluminium sheets or Al-coated iron or steel sheet having a thickness of e.g. 0.2 to 0.8 mm, usefully 0.3 to 0.7 mm and preferably 0.4 to 0.5 mm. One example is an A4 aluminium sheet Al 99.5 (purity 99.5 %) with a thickness of 0.5 mm.

The aluminium surfaces may also be subjected to a chemical or electrochemical brightening process or an alkaline pickling process. Such brightening or pickling processes are employed prior to anodising.

The aluminium surfaces may, for any topography of choice, exhibit a surface roughness $R_a$ of e.g. 0.01 to 5 µm, preferably from 0.01 to 0.5 µm. Further preferred, advantageous $R_a$ roughness values are from 0.01 to 0.4 µm and in particular from 0.03 to 0.06 µm, whereby 0.04 µm is especially suitable. The surface roughness characteristic $R_a$ is defined in at least one of the DIN standards 4761 to 4768.

In the case of the present reflectors at least one pre-treatment layer may be provided between the reflector body and the functional coating a).

In the case of a reflector body made mainly out of ferrous based metal, the pre-treatment layer may be a layer made by phosphate or chromate treatment or by zinc plating. In the case of a reflector body made of aluminium the pre-treatment layer may be a layer formed by chromate or phosphate treatment or by anodising. The pre-treatment layer is preferably made of anodized aluminium and is created directly out of the aluminium on the surface of the reflector body. The pre-treatment layer may have a thickness e.g. of at least 10 nm, usefully 20 nm, particularly useful is a thickness of at least 50 nm, preferably at least 100 nm and especially preferably at least 150 nm. The greatest thickness of the pre-treatment layer may e.g. be 1500 nm, preferably 200 nm. The pre-treatment layer has therefore a thickness of preferably 100 nm to 200 nm.

For example the pre-treatment layer may be an anodic oxide layer formed in a redissolving or non-redissolving electrolyte. The pre-treatment layer may also be a yellow chromate layer, a green chromate layer, a phosphate layer or a chrome-free pre-treatment layer which is formed in an electrolyte containing at least one of the elements Ti, Zr, F, Mo or Mn.

The functional coating a) is deposited directly onto the reflector body or—if present—on the pre-treatment layer. In the case of an anodic oxide layer the aluminium oxide layer formed by anodising may form the functional coating a).

For example, the functional coating a) exhibits a thickness of 0.5 to 20 µm, usefully 1 to 20 µm, preferably 2 to 10 µm and especially preferably 2 to 5 µm. If the aluminium oxide layer formed by anodising forms the functional coating a), then its thickness, as mentioned above, is from 20 to 1500 nm. The functional coating a) may e.g. be a gel film deposited using a sol-gel process. Further functional coatings a) are lacquers or polymers, thereby advantageously vacuum resistant lacquers and polymers, polyesters, epoxy, polycarbonates, acrylic, polyvinylchloride, polyvinylfluoride, polyvinylidenfluoride etc.

The gel film may be a coating with organo-functional silanes of a metal compound and may e.g.

A) have been obtained by hydraulic condensation of the following components, if desired in the presence of a condensation catalyst and/or the normal additives:

1. at least with one cross-linkable organo-functional silane of a compound having the formula (II):

in which the groups X, which may be the same or different, represent hydrogen, halogen, alk-oxy, acyloxy, alkylcarbonyl or —NR"2(R"=H and/or alkyl) and the radicals R'", which may be the same or different, represent alkyl, alkenyl, alkinyl, aryl, arylalkyl, alkylaryl, arylalkenyl, alkenaryl, arylalkinyl or alkinylaryl, where these radicals may be interrupted by O or S atoms or by the group —NR" and one or more substituents from the group of halogens and may, if desired, bear the substituted amino, amide, aldehyde, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups, and m has the value 1, 2 or 3, and /or with an oligomer derived therefrom, whereby the radical R'" and/or the substituent must be a cross-linkable radical or substituent, of an amount equal to 10 to 95 mol. %, with reference to the total mol number of the (monomer) starting components;

2. at least of one metal compound having the general formula III:

In which Me is a metal from the group comprising Al, Zr, Ti, where y in the case of aluminium is 3 and in the case of Ti and Zr is 4 and the radicals R, which may be the same or different stand for halogen, alkyl, alkoxy, acyloxy or hydroxy, where the just mentioned groups may be partially or wholly replaced by chelate ligands and/or with an oligomer and/or, if desired, a complex aluminium salt of an inorganic or organic acid, in an amount of 5 to 75 mol %, with reference to the total mole number of the (monomer) starting components, 3. if desired, at least with one non-cross-linkable organo-functional silane having the formula I:

in which the groups X, which may be the same or different, stand for hydrogen, halogen, hydroxy, alkoxy, acyloxy, , alkylcarbonyl or —NR"2(R"=H and/or alkyl) and the radicals R', which may be the same or different, represent alkyl, aryl, arylalkyl or alkylaryl, whereby these radicals may be interrupted by O or S atoms or by the group —NR", and one or more substituents from the group of halogens and may, if desired, bear the substituted amide, aldehyde, keto, alkylcarbonyl, carboxy, cyano, alkoxy, alkoxycarbonyl groups, and m has the value 1, 2 or 3, and /or with an oligomer derived therefrom, in an amount equal to 0 to 60 mol. %, with reference to the total mol number of the (monomer) starting components;

4. if desired, with one or more low-volatile oxides of an element of an element of the main group Ia to Va or the sub-groups IIb, IIIb, Vb to VIIIb of the periodic system with the exception of aluminium, which is/are soluble in the reaction medium, and/or one or more compounds of one of these elements which, under the reaction conditions, forms a low volatile oxide, in an amount of 0 to 70 mol %, with reference to the total mol number of the (monomer) starting components; and B) such that an organic pre-polymer is added to this hydrolytic condensate, whereby the reacting cross-linkable groups of the radical R''' and/or the cross-linkable substituents on the radical R''' can be cross-linked with those on the pre-polymer, or to advantage are of the same name, and the pre-polymer is added in an amount of 2 to 70 mol %, with reference to the total mol number of the (monomer) starting components;

C) the coating solution thus obtained is deposited onto a substrate, in particular onto the reflector body or the pre-treatment layer thereon, and subsequently hardened.

Further details and information concerning the functional coatings a) in the form of a gel-film may be found in EP-A 0 610 831 and EP-A 0 358 01 1.

The above mentioned silanes may be replaced by compounds which contain titanium, zirconium or aluminium instead of silicon. This way the hardness, density and refractive index of the functional coating may be varied. The hardness of the functional coating may also be controlled by use of different silanes, e.g. by forming an inorganic network to control the hardness and thermal stability, or by use of an organic network to control the elasticity. A functional coating, which may be provided between the inorganic and organic polymers, is deposited on the aluminium substrates e.g. via a sol-gel process by specific hydrolysis and condensation of alkoxides, principally those of silicon, aluminium, titanium and zirconium. In the process an inorganic network is created and, via appropriate derivated silicate esters, additional organic groups can be incorporated therein which on the one hand are employed for functional purposes and, on the other hand, are used to create defined organic polymer systems. Furthermore, the gel film may also be deposited by electro-immersion using the principle of catephoric deposition of an amine and organically modified ceramic.

The functional coating a), as the above mentioned silanes or the above mentioned lacquers, may be deposited by immersion, brush application, roll deposition, centrifugal application, spraying, so called coil coating etc. onto the reflector body directly or over a pre-treatment layer.

After coating the anodized surface of the reflector body with the functional coating a), the coating can be hardened. The hardening may take place by radiation such as UV-radiation, electron beam radiation or laser beam radiation and/or at elevated temperature. The temperature may raised by convection or thermal radiation such as infra-red and/or ultra-violet radiation, or by a combination of convection and thermal radiation such as UV and/or IR radiation or using hot gas such as hot air. The temperature, measured at the layer below the functional coating e.g. the metal layer such as the aluminium layer is greater than 110° C., usefully greater than 150° C. and preferably between 150 ° C. and 240° C. For clear lacquers these temperatures are e.g. often 230° C. to 240° C. The elevated temperature may e.g. be applied to the reflector body for 10 to 120 min. The convection heating may usefully be performed by applying heated gases, such as air, nitrogen, noble gases or mixtures thereof.

The functional coating a) effects a levelling or smoothing of the surface. $R_a$ values for example of less than 0.01 $\mu$m and preferably less than 0.02 $\mu$m are achieved. The surface roughness $R_a$ is defined in at least one of the DIN standards 4761 to 4768.

The functional coating a) may be a single layer i.e. a monolayer or a multiple layer, such as e.g. a double layer, triple layer etc. The multiple layers such as the double layers or triple layers may all be of the same material or of different materials, each selected from the above mentioned materials for functional coatings a). The double layer coating, triple layer coating etc. may be formed e.g. by depositing first one layer, pre-hardening or hardening the first layer, depositing the second layer and hardening the second layer. A first layer which has only been pre-hardened may be hardened along with the second layer. Should a third layer be deposited, then the first and the second layers may be hardened or pre-hardened, and the hardening may concern only the third layer or the hardening of the underlying layers—provided this is still necessary—may be performed along with the hardening of the third layer. Analogously, the same applies for further layers e.g. a fourth layer etc. Preheating includes processes such as allowing to dry, pre-drying under the influence of heat or radiation, or the application of radiation or heat treatment. The useful thickness of a double or triple layer lies in the above mentioned range of 1 to 20 $\mu$m, whereby each individually deposited layer may have a thickness e.g. of 2 to 5 $\mu$m.

The reflecting layer structure b) contains a reflecting layer such as e.g. a layer of aluminium, silver, copper, gold, chromium, nickel or alloys, e.g. containing mainly at least one of these metals. The thickness of the reflecting layer may e.g. amount to 10 to 200 nm (nanometer). As a rule the reflecting layer is applied directly onto the functional coating a) or onto an intermediate bonding layer.

Accordingly, the present invention includes reflectors containing a reflector body, if desired a pre-treatment layer which is deposited on the reflector body or is formed out of this itself, on top of that the functional coating, and on top of that the reflecting layer structure. The reflection layer structure itself exhibits the reflection layer, which as a rule lies on the functional layer. The reflection layer is covered by the protective layer. Consequently, the layer described as the protective layer always represents that layer on the reflector which lies outermost, is free and directly exposed to mechanical influences.

One or both layers in the reflection layer structure b) may e.g. be deposited onto the reflector body or onto a pre-treatment layer thereon e.g. by gas or vapour-phase deposition in vacuum (physical vapour deposition, PVD), by thermal vaporization, electron beam vapour deposition, with and without the assistance of ionization, by sputtering, in particular magnetron sputtering, by plasma-polymerisation or chemical gas phase deposition (chemical vapour deposition, CVD) with and without the assistance of plasma. Other methods of deposition are lacquering or immersion using solutions manufactured in the sol-gel process followed by drying, flame-pyrolitic process or flame coating using $SiO_2$. It is also possible e.g. to supplement PVD-layers by flame-coating with $SiO_2$.

The reflecting layer or reflection layer structure may be deposited on the surface e.g. in a process sequence which includes—possibly degreasing and cleaning—charging the item with the surface to be coated into a vacuum unit, cleaning e.g. by means of sputtering, glow-discharge etc., in a first step deposition of the light-reflecting, in particular metallic layer, and in a second step deposition of the transparent which represents the protective layer and discharging the coated item from the vacuum.

The reflecting layer may also be produced in an electrolytic or wet chemical process. The transparent layers and thereby in particular the protective layer may be present as gel-films which are produced in a sol-gel process. The transparent layers and thereby in particular the protective layer may also be produced in a flame-pyrolitic manner. It is also possible to employ different processes for the individual layers in a layer structure.

For example in the case of rolled products such as foils, strips or sheets or in the case of laminates with an aluminium layer, individual or advantageously all coatings are deposited or precipitated in a continuous manner, as a rule using the so called strip or continuous processes, also known as coil-coating. For the production of the pre-treatment layer e.g. the method of anodic oxidation of aluminium may be employed. Also the functional coating a) e.g. a sol-gel layer may be deposited in a continuous process, whereby the sol is deposited onto the surface to be coated by immersion, spraying etc. or in coil coating and subsequently dried or hardened by radiation and/or heat treatment in the continuous heat treatment furnace. Finally, the reflection layer structure b) may be deposited by vapour deposition, sputtering etc. in each case in vacuum etc.

The structure of reflection layer structure b) on the reflector body serves in particular the reflection of electromagnetic radiation or energy in the form of waves and/or particles, usefully for the reflection of radiation with wavelengths in the optical range and preferably visible light, in particular those waves with wavelengths between 400 and 750 nm.

The reflectors according to the invention with surfaces that bear a reflection layer structure according to the invention exhibit excellent reflecting properties e.g. for electromagnetic radiation and in particular electromagnetic radiation in the optical range. The optical range includes e.g. the infra-red radiation, the visible light range, the ultra-violet light range etc. The preferred field of application is the range of electromagnetic radiation and thereby the visible light range.

The reflection of radiation may, depending on the surface, be directional, scattered or a combination thereof. Accordingly, the reflectors according to the invention are suitable as reflectors such as reflectors e.g. for radiation sources or optical equipment. Such radiation sources are e.g. lamps, such as lamps for workplaces, primary lighting, secondary lighting, strip lighting, light guiding elements, lighted ceilings, light deflecting lamellae or thermal radiators. The reflectors may e.g. also be mirrors or interior mirrors of optical equipment, lamps or thermal radiators.

The reflection layer structure b) on the reflecting body leads in particular to reflectors whose coated surfaces exhibit a total reflection—measured acc. to DIN 5036—usefully of 90% and more.

The reflectors according to the present invention exhibit e.g. excellent resistance to wiping and also hardness. The resistance to wiping can be measured e.g. acc. to DIN 58196. In summary according to DIN 58196 a sample is tested using a felt type stamp applied with a force of 4.5N (corresponds approx. to 450 g) over a stretch of 120 mm 100 times within 74 seconds (1.3 Hz). The test cycle is repeated 20, 50 and 80 times; the sample is then evaluated. On a scale of 1 to 5 the value 1 represents no damage to the surface, 2 means traces of rubbing can be recognized on viewing under special lighting in a light box, 3 means traces of rubbing can be recognized on viewing in daylight, 4 means pronounced traces of rubbing are to be seen over the whole area and 5 means very pronounced traces of rubbing are to be seen over the whole surface area.

The reflectors, for example in the form of foils, strips or sheets can be shape formed and namely such that it is hardly possible to detect cracks. The reflectors according to the invention exhibit good protection against mechanical effects such as mechanical damage e.g. scratch hardness or wear and thereby in particular a high resistance to wiping. Mechanical damage can occur e.g. as a result of cleaning the surface i.e. the reflecting layers, due to dust, sand and the like which becomes trapped between the cleaning device and the surface or due to the cleaning equipment itself such as dusters, wipers, brushes etc.

The scope of the present invention includes also the use of reflectors containing a surface that is resistant to mechanical attack having high total reflectivity for reflection of radiation in the optical range i.e. daylight and artificial light, thermal radiation, visible light, ultra-violet light etc. Of particular importance is the use of the reflectors for reflecting visible light, in particular daylight or artificial light, including ultra-violet light. The reflectors according to the invention are e.g. suitable as reflectors or lighting elements in lighting or illumination technology such as e.g. reflectors in lamps for workplaces where display units with screens are in use, primary lighting, secondary lighting, strip lighting, light guiding elements, lighted ceilings or as light deflecting lamellae etc.

What is claimed is:

1. A reflector with high total reflection, resisting mechanical stress, containing a reflector body made of metal on which are superimposed, in the following order,
    (a) a functional coating composed of a material selected from the group consisting of a gel film, a varnish and a polymer, having a thickness of from 0.5 to 20 $\mu$m, and
    (b) a reflection layer structure containing a reflecting layer and a transparent protective layer, the reflecting layer being next to the functional coating, the transparent protective layer composed of a material selected from the group consisting of a silicon oxide of formula $SiO_x$ where x represents a number from 1.1 to 2.0, and an aluminum oxide of thickness of at least 3 nm, and the transparent protective layer being located on outer side of the reflector and protecting underlying layers against mechanical damage, and the transparent protective layer exhibits no surface damage in the wipe test according to DIN 58196 after 50 test cycles each of 100 wiping strokes.

2. The reflector according to claim 1, wherein the maximum thickness of the transparent protective layer is 1000 nm.

3. The reflector according to claim 2, wherein the minimum thickness of the transparent protective layer is 3 nm.

4. The reflector according to claim 1, wherein the thickness of the transparent protective layer corresponds to optical thickness having the formula $n \cdot d = \lambda/2 \pm 40$ nm, where n is the refractive index of the material of the transparent protective layer, d is the geometrical thickness of the layer and $\lambda$ corresponds to the intensity maximum of the wavelength of reflected electromagnetic radiation.

5. The reflector according to claim 4, wherein, in said formula, $\lambda$ corresponds to the intensity maximum of the wavelength of reflected electromagnetic radiation which lies in the optical range.

6. The reflector according to claim 4, wherein, in said formula, $\lambda$ corresponds to the intensity maximum of the wavelength of reflected electromagnetic radiation which lies between 400 and 750 nm.

7. The reflector according to claim 1, wherein the thickness of the transparent protective layer corresponds to optical thickness having the formula $n \cdot d = (k \cdot \lambda/2) \pm 40$ nm, where k is a natural number and n represents the refractive index of the material in the transparent protective layer and d is the geometrical thickness and corresponds to the intensity maximum of the wavelength of reflected electromagnetic radiation.

8. The reflector according to claim 7, wherein, in said formula k is 2, 3, 4, 5, 6, 7, 8, 9 or 10.

9. The reflector according to claim 7, wherein, in said formula, $\lambda$ corresponds to the intensity maximum of the wavelength of reflected electromagnetic radiation which lies in the range between 400 and 750 nm.

10. The reflector according to claim 7, wherein, in said formula, $\lambda$ corresponds to the intensity maximum of the wavelength of reflected electromagnetic radiation which lies in the optical range.

11. The reflector according to claim 7, wherein, in said formula, k is 2, 3, 4, 5, 6, 7, 8, 9 or 10, and $\lambda$ corresponds to the intensity maximum of the wavelength of reflected electromagnetic radiation which lies in the range between 400 and 750 nm.

12. The reflector according to claim 1, wherein the transparent protective layer is a silicon oxide having the formula $SiO_x$ where x is a number from 1.1 to 2.

13. The reflector according to claim 1, wherein the transparent protective layer is a gel film deposited in a sol-gel process or a thin film deposited in vacuum or a plasma-deposited thin film or a film created in a flame-pyrolitic manner.

14. The reflector according to claim 1, wherein the maximum thickness of the transparent protective layer is 400 nm.

15. The reflector according to claim 1, wherein the maximum thickness of the transparent protective layer is 40 nm and less.

16. The reflector according to claim 1, wherein the transparent protective layer is a silicon oxide having the formula $SiO_x$ where x is the number 1.8.

17. A process comprising manufacturing the reflector of claim 1.

18. A process comprising manufacturing a light-guiding element for artificial light and daylight, which includes the reflector of claim 1.

19. A light guiding element for artificial light and daylight, which incorporates the reflector of claim 1.

20. A display unit having a screen, a primary lighting unit, a secondary lighting unit, a strip lighting unit, a lighted ceiling unit or a light deflecting lamella which contains a lamp containing the reflector of claim 1.

21. The reflector according to claim 1, wherein the protective layer is a gel film deposited in a sol-gel process or a thin film deposited in vacuum or a plasma-deposited thin film or a film created in a flame-pyrolitic manner.

22. A reflector with high total reflection, resisting mechanical stress, containing a reflector body on which are superimposed, in the following order, (a) a functional coating composed of a material selected from the group consisting of (i) a gel-film having a thickness of 0.5 to 20 μm, (ii) a lacquer having a thickness of 0.5 to 20 μm, (iii) a polymer having a thickness of 0.5 to 20 μm, and (iv), where the reflector body is composed of aluminum, anodically oxidized aluminum, which is formed directly out of surface aluminum of the aluminum reflector body, having a thickness of 10 to 1500 nm, and (b) a reflection layer structure containing a reflecting layer and a transparent protective layer,
the transparent protective layer is composed of a material selected from the group consisting of a silicon oxide of formula $SiO_x$ where x represents a number from 1.1 to 2.0 and an aluminum oxide having the formula $Al_2O_3$, of thickness of at least 3 nm, and the transparent protective layer being located on outside of the reflector and protecting the underlying reflecting layer against mechanical damage and the transparent protective layer exhibits no surface damage in the wipe test according to DIN 58196 after 50 test cycles, each of 100 wiping strokes.

23. The reflector according to claim 22, wherein the maximum thickness of the transparent protective layer is 1000 nm.

24. The reflector according to claim 22, wherein the minimum thickness of the transparent protective layer is 3 nm.

25. The reflector according to claim 22, wherein the thickness of the transparent protective layer corresponds to optical thickness having the formula $n \cdot d = \lambda/2 \pm 40$ nm, where n is the refractive index of the material of the transparent protective layer, d is the geometrical thickness of the layer and $\lambda$ corresponds to the intensity maximum of the wavelength of reflected electromagnetic lies in the optical range.

26. The reflector according to claim 25, wherein, in said formula, $\lambda$ corresponds to the intensity maximum of the wavelength of reflected electromagnetic radiation which lies in the range between 400 and 750 nm.

27. The reflector according to claim 22, wherein the thickness of the transparent protective layer corresponds to optical thickness having the formula $n \cdot d = (k \cdot \lambda/2) \pm 40$ nm, where k is a natural number, and n represents the refractive index of the material in the transparent protective layer and d is the geometrical thickness of the transparent protective layer and $\lambda$ corresponds to the intensity maximum of the wavelength of reflected electromagnetic radiation lies in the optical range.

28. The reflector according to claim 27, wherein, in said formula, k is 2, 3, 4, 5, 6, 7, 8, 9 or 10.

29. The reflector according to claim 27, wherein, in said formula, $\lambda$ corresponds to the intensity maximum of the wavelength of reflected electromagnetic radiation which lies in the range between 400 and 750 nm.

30. The reflector according to claim 27, wherein, in said formula, k is 2, 3, 4, 5, 6, 7, 8, 9 or 10, and $\lambda$ corresponds to the intensity maximum of the wavelength of reflected electromagnetic radiation which lies in the range between 400 and 750 nm.

31. The reflector according to claim 22, wherein the transparent protective layer is of a silicon oxide having the general formula $SiO_x$ where x is a number from 1.1 to 2.

32. The reflector according to claim 22, wherein the transparent protective layer is a gel film deposited in a sol-gel process or a thin film deposited in vacuum or a plasma-deposited thin film or a film created in a flame-pyrolitic manner.

33. The reflector according to claim 22, wherein the maximum thickness of the transparent protective layer is 400 nm.

34. The reflector according to claim 22, wherein the maximum thickness of the transparent protective layer is 40 nm and less.

35. The reflector according to claim 22, wherein the transparent protective layer is a silicon oxide having the formula $SiO_x$ where x is the number 1.8.

36. A process comprising manufacturing the reflector of claim 22.

37. A process comprising manufacturing a light-guiding element for artificial light and daylight, which includes the reflector of claim 22.

38. A light guiding element for artificial light and daylight, which incorporates the reflector of claim 22.

39. A display unit having a screen, a primary lighting unit, a secondary lighting unit, a strip lighting unit, a lighted ceiling unit or a light deflecting lamella which contains a lamp containing the reflector of claim 22.

* * * * *